(12) United States Patent
Bovio

(10) Patent No.: US 10,978,968 B2
(45) Date of Patent: Apr. 13, 2021

(54) METHOD FOR REDUCING THE MAXIMUM INRUSH CURRENT OF A COMPRESSOR SYSTEM COMPRISING MULTIPLE ASYNCHRONOUS ELECTRICAL MOTORS AND A COMPRESSOR SYSTEM FOR IMPLEMENTING THIS METHOD

(71) Applicants: Carrier Corporation, Palm Beach Gardens, FL (US); Stefano Bovio, Villeurbanne (FR)

(72) Inventor: Stefano Bovio, Villeurbanne (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/500,953

(22) PCT Filed: Apr. 6, 2017

(86) PCT No.: PCT/IB2017/000552
§ 371 (c)(1),
(2) Date: Oct. 4, 2019

(87) PCT Pub. No.: WO2018/185514
PCT Pub. Date: Oct. 11, 2018

(65) Prior Publication Data
US 2020/0119664 A1    Apr. 16, 2020

(51) Int. Cl.
*H02P 1/58* (2006.01)
*F25B 49/02* (2006.01)
*H02P 1/26* (2006.01)

(52) U.S. Cl.
CPC ............. *H02P 1/58* (2013.01); *F25B 49/022* (2013.01); *F25B 49/025* (2013.01); *H02P 1/26* (2013.01);

(Continued)

(58) Field of Classification Search
USPC ........................................................ 318/560
See application file for complete search history.

(56) References Cited

U.S. PATENT DOCUMENTS

| 2,225,291 A | 12/1940 | Alderson |
| 2,295,775 A | 9/1942 | Crittenden |

(Continued)

FOREIGN PATENT DOCUMENTS

| CN | 104153979 A | 11/2014 |
| CN | 104848620 A | 8/2015 |

(Continued)

OTHER PUBLICATIONS

International Search Report and Written Opinion for application PCT/IB2017/000552, dated Feb. 7, 2018, 13 pages.

*Primary Examiner* — Bentsu Ro
(74) *Attorney, Agent, or Firm* — Cantor Colburn LLP

(57) ABSTRACT

This method for controlling asynchronous electrical motors of a compressor system, comprises: —receiving an order to start a first asynchronous electrical motor and a second asynchronous electrical motor of a compressor system; —unloading said first and second motors, by operating respectively a first load control unit of the first motor and a second load control unit of the second motor, in order to reduce the mechanical load associated to said motors; —starting the first motor and, only once the first motor is running at nominal speed, starting the second motor, —loading both the first and second electrical motor only once the second motor has started and is running at nominal speed, by operating the first load control unit and the second load control unit, in order to increase the mechanical load associated to said motors.

5 Claims, 6 Drawing Sheets

(52) U.S. Cl.
CPC ..... *F25B 2400/075* (2013.01); *F25B 2500/26* (2013.01); *F25B 2600/024* (2013.01); *F25B 2600/026* (2013.01)

(56) References Cited

U.S. PATENT DOCUMENTS

| | | | |
|---|---|---|---|
| 2,921,732 A | 1/1960 | De Vin | |
| 3,513,662 A | 5/1970 | Golber | |
| RE29,621 E | 5/1978 | Conley et al. | |
| 4,102,149 A | 7/1978 | Conley et al. | |
| 4,432,698 A | 2/1984 | Shirakuma et al. | |
| 5,211,026 A | 5/1993 | Linnert | |
| 5,343,384 A | 8/1994 | Fisher et al. | |
| 5,713,724 A | 2/1998 | Centers et al. | |
| 6,287,083 B1 | 9/2001 | Hase et al. | |
| 6,394,120 B1 | 5/2002 | Wichert | |
| 6,419,454 B1 | 7/2002 | Christiansen | |
| 6,601,397 B2 | 8/2003 | Pham et al. | |
| 6,773,224 B2 | 8/2004 | Ito et al. | |
| 6,962,058 B2 | 11/2005 | Kim et al. | |
| 7,028,491 B2 | 4/2006 | Hortin | |
| 7,096,681 B2 | 8/2006 | Wills et al. | |
| 7,207,183 B2 | 4/2007 | Crane et al. | |
| 7,231,773 B2 | 6/2007 | Crane et al. | |
| 7,955,056 B2 | 6/2011 | Pettersson | |
| 8,517,693 B2 | 8/2013 | Martin et al. | |
| 9,464,836 B2 | 10/2016 | Kim et al. | |
| 9,476,624 B2 | 10/2016 | Noll et al. | |
| 9,534,822 B2 | 1/2017 | Karkhanis et al. | |
| 2005/0210895 A1* | 9/2005 | Horton | F04B 41/06 62/158 |
| 2006/0216159 A1 | 9/2006 | Raghavachari | |
| 2007/0056300 A1 | 3/2007 | Crane | |
| 2009/0217679 A1 | 9/2009 | Raghavachari | |
| 2010/0278660 A1* | 11/2010 | Burchill | F04B 49/02 417/53 |
| 2011/0138831 A1* | 6/2011 | Ogata | F25B 9/06 62/193 |
| 2013/0047635 A1 | 2/2013 | Shultz et al. | |
| 2019/0234663 A1* | 8/2019 | Uhlendorf | F25B 49/022 |

FOREIGN PATENT DOCUMENTS

| | | |
|---|---|---|
| GB | 905519 A | 9/1962 |
| JP | S6093499 U | 6/1985 |
| JP | 2011038434 A | 2/2011 |
| WO | 2013020034 A2 | 2/2013 |
| WO | 2013121442 A2 | 8/2013 |

* cited by examiner

METHOD FOR REDUCING THE MAXIMUM INRUSH CURRENT OF A COMPRESSOR SYSTEM COMPRISING MULTIPLE ASYNCHRONOUS ELECTRICAL MOTORS AND A COMPRESSOR SYSTEM FOR IMPLEMENTING THIS METHOD

TECHNICAL FIELD OF THE DISCLOSED EMBODIMENTS

The disclosed embodiments relate to the operation of compressor units driven by asynchronous electric motors and, more generally, to a method for reducing the maximum inrush current of a compressor system comprising multiple asynchronous electrical motors. The invention also relates to a compressor system adapted to implement this method.

BACKGROUND OF THE DISCLOSED EMBODIMENTS

Compressor systems, such as chillers for domestic or industrial air-conditioned systems, include compressors that are driven by one or several electrical motors, such as asynchronous motors. These electrical motors are powered with a three-phase electrical current delivered by a power source through a power delivery network.

Typically, when an asynchronous electrical motor is started up, the electrical current required to power the motor rises considerably with an amplitude that is several times higher than the full load amperage, i.e. the electrical current required once the motor is operating at maximum speed with a full load. This problem is compounded when the compressor system comprises several electrical motors operated simultaneously.

A drawback of this so-called inrush current is that the power delivery network must be designed in accordance with the expected value of the inrush current, which increases the cost and the complexity of the fixed infrastructure. For example, the power delivery network must include fuses, transformers and circuit breakers having ratings larger than those required for the nominal operation mode.

Also, in some instances, public utilities may impose limits on the value of the maximum inrush current that can be drawn from public power distribution networks for an installation of a given size.

To mitigate this drawback, it is known to use starter circuits to switch the connection pattern of the windings of the motor between a star pattern and a delta pattern. However, the reduction of inrush current may not always be sufficient for some applications.

Other possible known solutions to this problem may include reducing the size of the electrical motor or adding a variable frequency drive to each motor in order to control precisely the input current fed to this motor. This way, the inrush current may be reduced. However, such solutions increase the cost and the complexity of the compressor unit and are therefore not satisfactory. Additionally, the efficiency of the electrical motor at maximum speed may be significantly reduced.

SUMMARY OF THE DISCLOSED EMBODIMENTS

The object of the present disclosed embodiments is therefore to provide a compressor system and a method for controlling a compressor system comprising multiple asynchronous electrical motors for reducing the maximum inrush current, these method and apparatus being cost-effective and simple to implement.

To that end, the disclosed embodiments relate to a method for controlling asynchronous electrical motors of a compressor system, this method comprising:
  receiving a command to start a first asynchronous electrical motor and a second asynchronous electrical motor of a compressor system;
  unloading said first and second motor, by operating respectively a first load control unit of the first motor and a second load control unit of the second motor, in order to reduce the mechanical load associated to said motors;
  starting the first motor and, only once the first motor is running at nominal speed, starting the second motor,
  loading both the first and second electrical motor only once the second motor has started and is running at nominal speed, by operating the first load control unit and the second load control unit, in order to increase the mechanical load associated to said motors.

An advantage of these embodiments is that, by starting all motors one after another in the unloaded state, then waiting until all motors have reached an operation mode where no inrush current is present before loading the motors, then the maximum total inrush current drawn by the multiple motors is reduced.

In another embodiment, this method further comprises:
  stopping one motor among the first motor and the second motor and, while the other motor is still running, receiving a command to restart said one motor;
  unloading the first motor and the second motor, by operating the first load control unit and the second load control unit, in order to increase the mechanical load associated to said motors;
  starting said one motor, while the other motor among the first motor and the second motor is still running;
  loading both the first and second electrical motor only once said one motor has started and is running at nominal speed, by operating the first load control unit and the second load control unit, in order to increase the mechanical load associated to said motors.

In yet another embodiment, the first electrical motor belongs to a first compressor and the second electrical motor belongs to a second compressor, said first and second compressors being screw compressors, the first and second load control units each comprising a slide inlet valve.

According to another aspect, the disclosed embodiments relate to a compressor system comprising asynchronous electrical motors, wherein the compressor system is adapted to:
  receive a command to start a first asynchronous electrical motor and a second asynchronous electrical motor of a compressor system;
  unload said first and second motor, by operating respectively a first load control unit of the first motor and a second load control unit of the second motor, in order to reduce the mechanical load associated to said motors;
  start the first motor and, only once the first motor is running at nominal speed, start the second motor,
  load both the first and second electrical motor only once the second motor has started and is running at nominal speed, by operating the first load control unit and the second load control unit, in order to increase the mechanical load associated to said motors.

In another embodiment, the compressor system is further adapted to:
- stop one motor among the first motor and the second motor and, while the other motor among the first motor and the second motor is still running, receiving a command to restart said one motor;
- unload the first motor and the second motor, by operating the first load control unit and the second load control unit, in order to increase the mechanical load associated to said motors;
- start said one motor, while the other motor is still running;
- load both the first and second electrical motor only once said one motor has started and is running at nominal speed, by operating the first load control unit and the second load control unit, in order to increase the mechanical load associated to said motors.

BRIEF DESCRIPTION OF THE DRAWINGS

The disclosed embodiments and other features will be better understood upon reading the following description, provided solely as an example, and made in reference to the appended drawings, in which.

DETAILED DESCRIPTION OF THE DISCLOSED EMBODIMENTS

Figure 1:
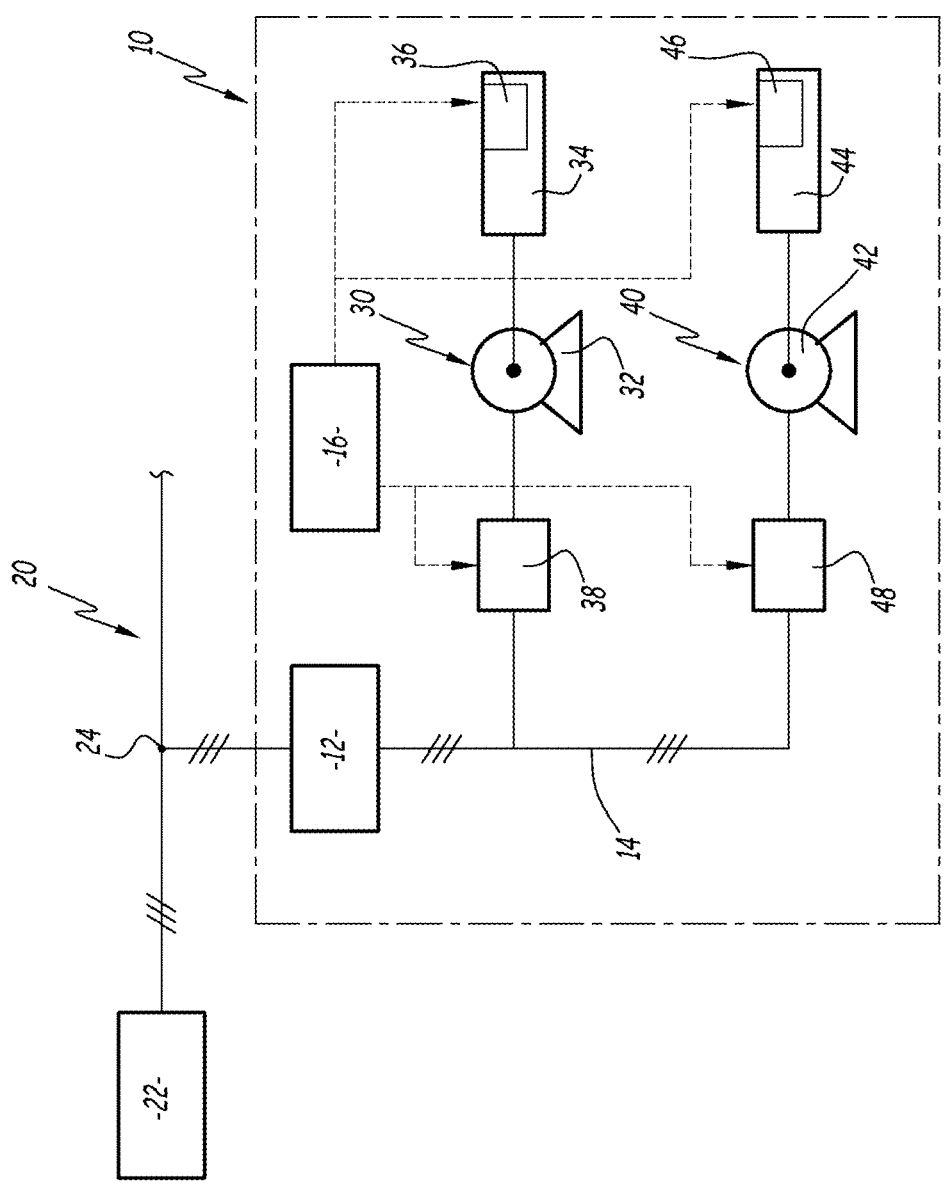
FIG. 1 is a simplified diagram of a compressor system according to the disclosed embodiments and comprising several electrical motors.

FIG. 1 illustrates an exemplary compressor system 10, such as a chiller for an air-conditioning apparatus.

The compressor system 10 is meant to be powered by a three-phase electrical power, e.g. a set of three AC input currents. To that end, compressor unit 10 comprises an internal power bus 14, which is made of three electrical conductors, such as wires or busbars, each associated to a phase of a three-phase electrical current.

The compressor system 10 also includes a power conditioning circuit 12 adapted to filter the three-phase current received from the power distribution network 20 in order to protect the compressor system 10 from unwanted power surges and/or electromagnetic interferences. For example, this conditioning circuit 12 comprises a breaker and/or a power converter.

Compressor unit 10 also comprises a control circuit 16. For example, the control circuit 16 comprises a programmable electronic logic unit, such as microcontroller, and also comprises a memory unit.

The internal power bus 12 is connected to an external power distribution network 20, such as a power grid of a public utility, which is powered by a power source 22, e.g. a generator, adapted to deliver a three-phase electrical power.

For example, the internal power bus 12 is powered with a three-phase power having a voltage equal to 400 Volts between phases and a frequency equal to 50 Hz. These values may be different. For example, in some embodiments, the voltage between two phases is equal to 460 Volts and the frequency is equal to 60 Hz.

On FIG. 1, the reference "24" denotes a connection point between electrical conductors of the power distribution network 20 and the electrical conductors of the power bus 12.

In this embodiment, the compressor system 10 further includes a first compressor 30 and a second compressor 40.

The first compressor 30 comprises a first electrical motor 32 mechanically coupled to a first mechanical load 34, a controllable load control unit 36, and a starter circuit 38 for the motor 32.

In this example, the first compressor 30 is used to compress a fluid, such as a refrigerant, as part of an air-conditioning apparatus implementing a vapor-compression refrigeration cycle. For example, this fluid is compressed and is then circulated in a dedicated cooling circuit, not illustrated, towards a heat exchanger in order to cool a target such as a room or a piece of equipment.

The electrical motor 32 is an asynchronous motor meant to be powered by a three-phase alternating current received from the power bus 12. The electrical motor 32 comprises a stator and a rotor, not illustrated. The rotor is movable in rotation relative to the stator around a rotation axis.

The stator comprises three electromagnets, or windings, which are adapted to generate a rotating magnetic field when they are powered by the three-phase AC current. Each winding is associated to a phase of the electrical current.

The rotor comprises magnetic elements, which interact with the generated rotating magnetic field in order to drive the rotation of the rotor around the rotation axis. For example, the rotor is a so-called squirrel-cage rotor. The rotor drives an output shaft which is mechanically coupled to the load 34.

In this embodiment, the compressor 30 is a rotary screw compressor. The load 34 comprises two meshed helical screws of corresponding shapes, which are driven in rotation by the output shaft by means of appropriate mechanical couplings. The load control unit 36 is a slide inlet valve of compressor 30.

The load control unit 36 is used to regulate the amount of fluid that can circulate through the compressor 30. It can thus be used to regulate indirectly the degree of coupling between the first motor 32 and the first load 34.

For example, the load control unit 36 is selectively and reversibly movable between a first position and a second position. In the first position, also named loaded state, the load 34 has a maximum value. In the second position, also named unloaded state, the load 34 has a minimal value that is smaller than the maximum value. This commutation is performed with a controllable actuator, e.g. commanded by control circuit 16.

The first motor 32 is selectively connected to or disconnected from the internal power bus 12 by means of the first starter circuit 38. For example, the starter circuit 38 is electrically connected in series between the internal bus 12 and the windings of the motor 32 by means of three electrical conductors dedicated to each electrical phase, each winding of the motor 32 being connected to a single phase of the bus 12.

For example, the first starter circuit 38 includes a commandable switch that is selectively commutable between open and closed positions. For example, this power switch is an electromechanical switch, or a mechanical switch, or a power transistor such as an Insulated Gate Bipolar Transistor. For example, this power switch is by default in an open state, meaning that no electrical current can flow from internal bus 12 towards motor 32 until the power switch is commanded otherwise.

In this example, the commutation is operated by the control circuit 6, for example by means of an electrical signal. The control circuit 16 is thus connected to the first starter circuit 38. This way, the first motor 32 can be started by the control circuit 16.

Optionally, the first starter circuit 38 connects the windings of the first motor 32 and is adapted to selectively change the connection pattern of the windings between a delta pattern and a star pattern.

When started, the motor 32 is adapted to first go through a so-called ramp-up phase, or starting phase, in which the rotation speed of the rotor is gradually increased towards a nominal value. Then the motor 32 is adapted to go through a so-called nominal phase, during which it runs at nominal speed.

The second compressor 40 comprises a second electrical motor 42 mechanically coupled to a second load 44, a second load control unit 46 and a second starter unit 48 for the second motor 42.

The second electrical motor 42 and the second load 44 are similar to the first motor 32 and to the first load 34, respectively. The same applies for the second load control unit 46 and the second starter circuit 48, compared to the load control unit 36 and the first starter circuit 38.

The operation of compressor 40 is similar to that of compressor 30. The second motor 42 is adapted to be connected to the power bus 12, in parallel with the first motor 32, through the second starter circuit 48.

In other words, motors 32 and 42 are meant to be connected to a same connection point, i.e. on power bus 12.

In other embodiments, the compressor system 10 may comprise more than two electrical motors. For example, compressor system 10 may include more than two compressors, said compressors being analogous to compressors 30 or 40.

According to the disclosed embodiments, the compressor system 10 and the control circuit 16 are programmed to unload each motor 32, 42 before it is started, by controlling the corresponding load control unit 36, 46 towards the unloaded state, and to load them again when they are both running in their nominal operation mode. This way, the motors 32 and 42 draw less electrical current during their starting phase. The inrush currents are therefore reduced.

Additionally, the control circuit 16 is programmed to start the first and second motors 32, 42 in sequence one after the other when it receives an instruction to start the compressor system 10.

Figure 2:
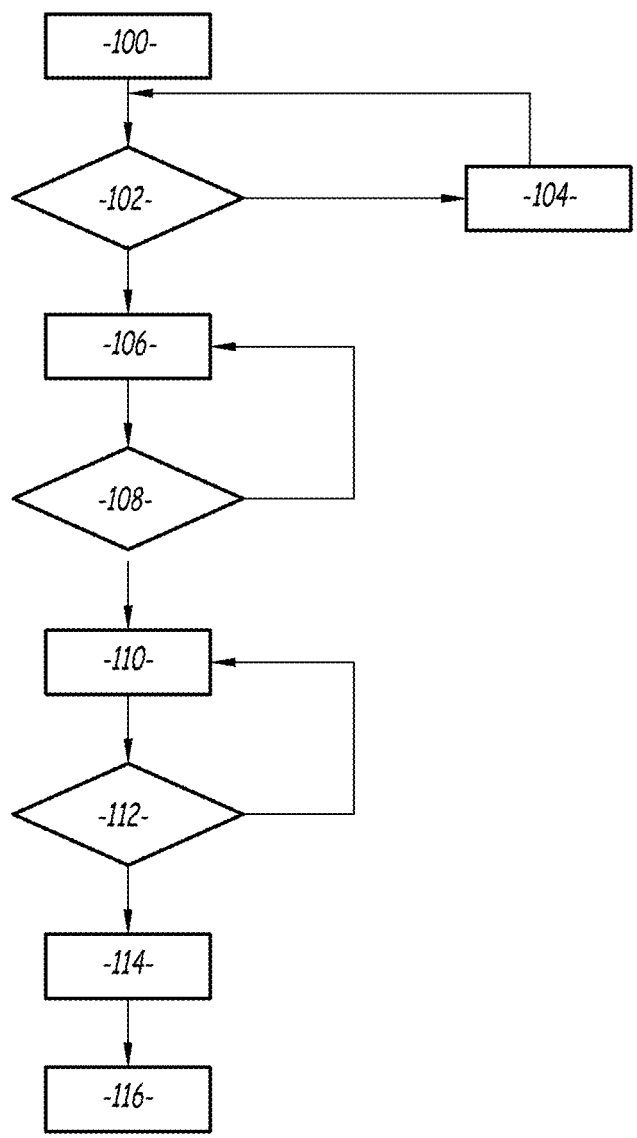
FIG. 2 is a flow chart illustrating a method for operating the compressor system of FIG. 1 for starting two electrical motors.

An exemplary method for controlling the operation of compressor unit 10 is now described in reference to the flow chart of FIG. 2.

Initially, the internal bus 12 is powered by the power distribution network 20 and the power switch 36 is in an open state. Both motors 32 and 42 are stopped.

During step 100, the compressor system 10 receives a command to start the compressors 30 and 40. Such command is for example received and automatically processed by the control circuit 16.

At step 102, the control circuit 16 checks the state of the load control units 36 and 46, for example by reading a state of the actuators associated to said load control units 36 and 46.

If any one of said load control units 36, 46 is found to be in the loaded state, then during a step 104, the corresponding load control units are unloaded.

If both load control units 36 and 46 are in the unloaded state, then, during a subsequent step 106, the first motor 32 is started. For example, the control circuit 16 activates the corresponding starter circuit 38 in order to connect the windings of the motor 32 to the power bus 12. An electrical current then flows from the internal power bus 12 into the electrical conductors leading to the windings of the motor 32 and the rotor starts to rotate around its rotation axis.

At step 108, the state of the motor 32 is verified, for example by the control circuit 16. If the ramp-up phase is found to be over and the motor 32 is running at full speed, then at a subsequent step 110 the second motor 42 is started, for example in a similar fashion as described in reference to step 106. The step of determining whether the ramp-up phase is over is for example performed by the control circuit 16, by measuring the value of the electrical current drawn by the motor 32 over the internal power bus 12 using a current sensor, such as a Rogowski coil sensor.

In this example, if at step 108 the ramp-up phase is not found to be over and the motor 32 has not started, then, the motor 42 is not started and the motor 32 is restarted. As an alternative, the motor 32 is stopped and the process is interrupted by the control circuit 16.

At step 112, the state of the motor 42 is verified, for example by the control circuit 16, in order to determine whether the motor 42 has fully started. This step 112 is similar to step 108.

If the ramp-up phase is found to be over and the motor 32 is running at full speed, then at a subsequent step 114, both load control units 36 and 46 are loaded.

At step 116, both motors 32 and 42 are running at full speed while driving their respective full load 34 and 44.

In some embodiments, no determination of whether the ramp-up phase is over is performed by the control circuit 16. Instead, the control circuit 16 may rely on a time delay defined from calibration data obtained during prior calibration steps performed for this compressor 30. For example, the time required by motor 32 to reach the full operating regime for a given load is measured. A corresponding time delay is then defined and stored in a memory of the control circuit 16. Therefore, in these embodiments, step 108 is replaced by a step of counting down the corresponding time delay and taking the corresponding action once the time delay has expired. The same applies to step 112.

Figure 3:
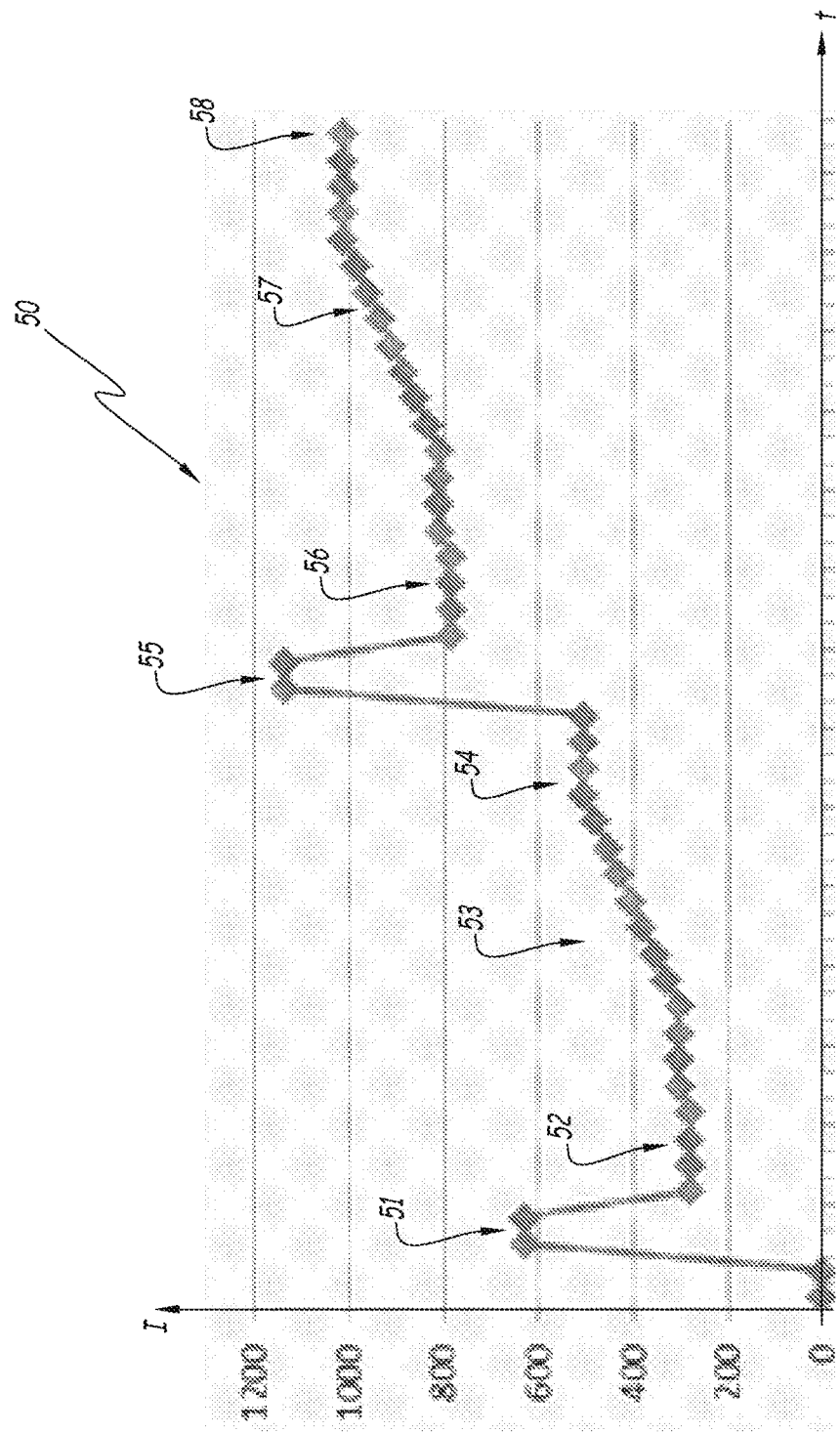
FIG. 3 is a graph illustrating the evolution, as a function of time, of the total electrical current drawn by the electrical motors of the compressor system of FIG. 1 in known systems.
Figure 4:
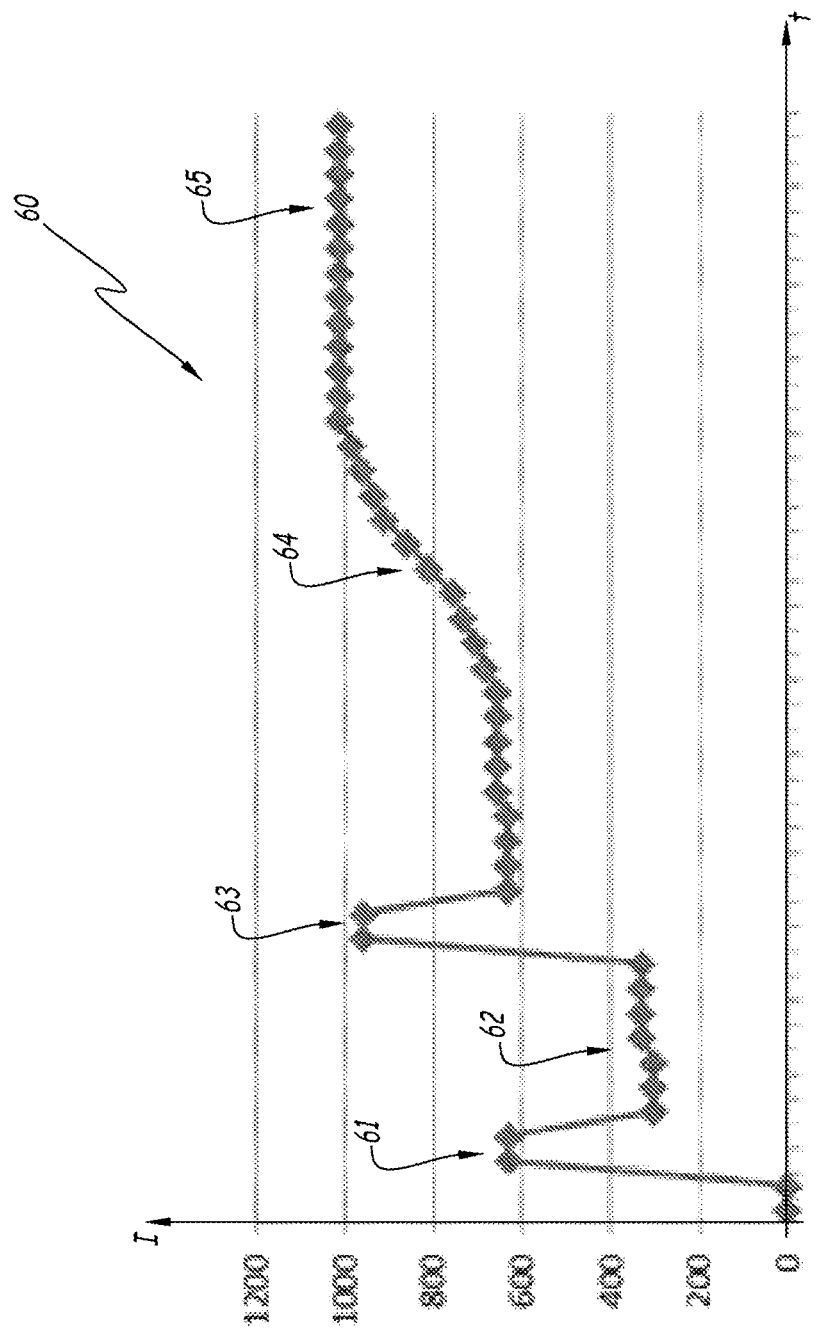
FIG. 4 is a graph illustrating the evolution, as a function of time, of the total electrical current consumed by the electrical motors of the compressor system of FIG. 1 according to the disclosed embodiments.

As illustrated in FIGS. 3 and 4, starting motors 32 and 42 with a minimal load according the disclosed embodiments reduces the value of the input current required to power them.

For example, FIG. 3 depicts a graph 50 expressing, as a function of time t, the value of the electrical current I, in Amperes, drawn by the motors 32 and 42 from the bus 12 in an embodiment where this method is not used. Instead, a known method is used, in which each motor 32, 42 is loaded immediately after it has started, regardless of the state of the other motor.

On this graph 50, the arrow 51 illustrates the inrush current due to the first motor 32 when it is started. In this example, this inrush current reaches a value of 629 Amperes. At arrow 52, the motor 32 has finished starting and is running at a nominal speed, yet in an unloaded state. The input current drawn by motor 32 is equal to 279 Amperes. The load control unit 36 is switched towards its loaded state and, as a result, the motor 32 must provide an increased power to drive load 43. The input current drawn from power line 121 correspondingly rises (arrow 53), until reaching its maximum value, here equal to 505 Amperes (arrow 54).

The same steps are repeated for starting the second motor 42, with arrows 55, 56, 57 and 58 corresponding to arrows 51, 52, 53 and 54. At arrow 55, the maximum current cumulatively drawn by motors 32 and 42 is equal to 1134 Amperes, which is higher than the current cumulatively drawn by both motors 32 and 42 when both are running at full speed with a full load (arrow 58), here equal to 1010 Amperes.

FIG. 4 depicts a graph 60 expressing, as a function of time t, the value of the electrical current I, in Amperes, drawn by the motors 32 and 42 from the bus 12 in an exemplary embodiment where the method of FIG. 2 is used.

The inrush current due to the first motor (arrow 61) is equal to 629 Amperes and, when the second motor 42 has started (arrow 63), the cumulative current is equal to 957 Amperes. This value is lower than the current value due to motors 32 and 42 when running at full speed and with a full load (arrow 65), here equal to 1010 Amperes.

The unloading sequence allows starting the motors with a lower load so that they draw less current. As a consequence, the total inrush current is reduced. In this case, it is lower than the maximum operating current. In other words, even when one of the motors is starting, the inrush current drawn does not cause the total current of the whole compressor 10 to rise above the maximum operating value. Therefore, it is not necessary to oversize the power distribution network 20 well above this maximum operating value. Furthermore, this method can be implemented in existing compressor systems 10 without requiring the use of variable frequency drives.

If the compressor system 10 comprises additional compressors, then the method described above can be applied similarly, by starting all motors one after another and then loading them at once after all motors have entered a nominal operating regime.

In other embodiments, the control circuit 16 is further programmed to, when one of the motors 32, 42 is already running with a full load and the other motor must be started, to unload the corresponding running motor before starting the other motor.

An exemplary method for controlling the operation of compressor unit 10 according to these embodiments is now described with reference to the flow chart of FIG. 5.

Figure 5:
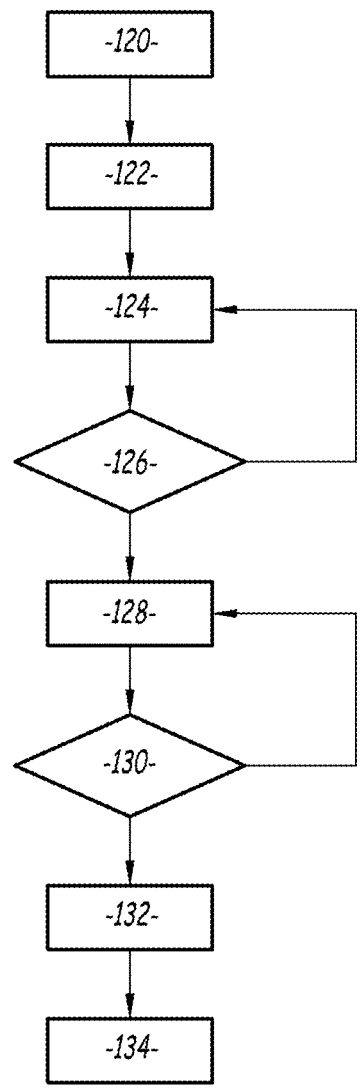
FIG. 5 is a flow chart illustrating a method for operating the compressor system of FIG. 1 for starting one of the electrical motors when at least one other electrical motor of the compression system is already running.
Figure 6:
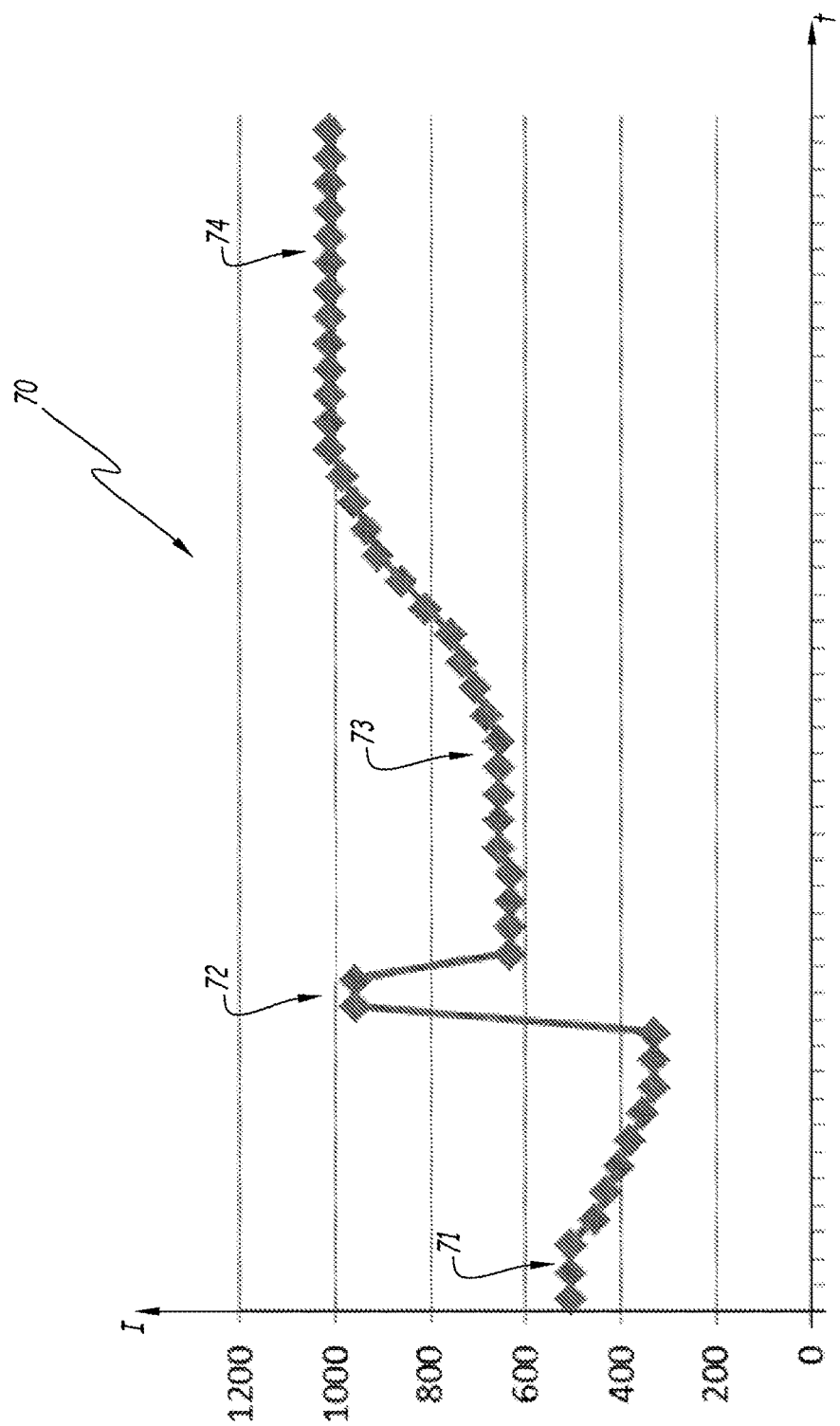
FIG. 6 is a graph illustrating the evolution, as a function of time, of the total electrical current consumed by the electrical motors of the compressor system of FIG. 1.

FIG. 6 depicts a graph 70 expressing, as a function of time t, the value of the electrical current I, in Amperes, drawn by the motors 32 and 42 from the bus 12 in embodiments where the method according to FIG. 5 is used.

Initially, at step 120, the first motor 32 is running at full speed and the second motor 42 is not running. For example, if both motors 32 and 42 are running, then one of them is stopped. In this example, the second motor 42 is stopped.

In other embodiments, the motor 32 is stopped and the second motor 42 is running. The first method is then modified in consequence. The method also applies if the compressor system 10 comprises additional motors.

Then, during step 122, the compressor system 10 receives a command to start the compressor 40. This command is for example received and automatically processed by the control circuit 16, which starts the second motor 42.

At step 124, the load control unit 36 of the first motor 32 is unloaded, so as to reduce the load driven by motor 32 and, in turn, reduce the input current required by the first motor 32. As the load decreases, the power required by the first motor 32 to drive the load 34 decreases as well and so the motor 32 gradually draws less current. This diminution is illustrated by arrow 71 on FIG. 6.

At step 126, the control circuit 16 checks whether the motor 32 is unloaded, i.e. whether the load control unit 36 has returned to the unloaded state, for example by reading a state of the actuators associated to said load control unit 36.

If the load control unit 36 has correctly returned to the unloaded state, then, during a subsequent step 128, the second motor 42 is started with its load control unit 46 unloaded. For example, the control circuit 16 activates the corresponding starter circuit 48 in order to connect the windings of the motor 42 to the power bus 12. An electrical current then flows from the internal power bus 12 into the electrical conductors leading to the windings of the motor 42 and the rotor starts to rotate around its rotation axis. However, if the load control unit 36 has not returned to the unloaded state, then step 124 is applied again.

When the second motor 42 is starting, it enters a ramp-up phase during which it briefly draws a high-intensity inrush current, which adds up to the current drawn by the first motor 32. The total current required to power compressors 30 and 40 rises correspondingly, as illustrated by arrow 72 on FIG. 6.

At step 130, the state of the motor 42 is verified, for example by the control circuit 16. The step of determining whether the ramp-up phase is over is for example performed by the control circuit 16, similarly to what was described above for step 108.

If the ramp-up phase is found to be over and the motor 42 is running at full speed, then, during a subsequent step 132, both load control units 36 and 46 are loaded. The total input current rises, as illustrated by arrow 73 on FIG. 6.

Finally, at step 134, once the load control units 36 and 46 are both in their loaded state, both motors 32 and 42 are running at full speed while driving their corresponding full load 34 and 44, respectively. The total input current reaches a maximum value, as illustrated by arrow 74. Yet, thanks to this embodiment, the maximum current drawn during the ramp-up phase of the motor 42 remains lower than this maximum value The embodiments and alternatives described above may be combined with each other in order to generate new embodiments of the invention.

The invention claimed is:

1. A method for controlling asynchronous electrical motors (32, 42) of a compressor system (10), this method comprising:
   receiving (100) a command to start a first asynchronous electrical motor (32) and a second asynchronous electrical motor (42) of a compressor system (10);
   unloading (104) said first and second motor, by operating respectively a first load control unit (36) of the first motor and a second load control unit (46) of the second motor, in order to reduce the mechanical load (34, 44) associated to said motors;
   starting (106) the first motor (32) and, only once the first motor is running at nominal speed, starting (110) the second motor (42),
   loading (114) both the first and the second motors only once the second motor has started and is running at nominal speed, by operating the first load control unit (36) and the second load control unit (46), in order to increase the mechanical load associated to said motors.

2. The method of claim 1, wherein this method further comprises:
   stopping the second motor (42) and, while the first motor (32) (42) is still running, receiving a command to restart the second motor;
   unloading (124) the first motor (32) and the second motor (42), by operating the first load control unit and the second load control unit, in order to increase the mechanical load associated to said motors;
   starting (128) said second motor (42), while the first motor (32) is still running;
   loading (132) both the first and the second motor only once the second motor has started and is running at nominal speed, by operating the first load control unit (36) and the second load control unit (46), in order to increase the mechanical load associated to said motors.

3. The method according to claim 1, wherein the first electrical motor (32) belongs to a first compressor (30) and the second electrical motor (42) belongs to a second compressor (40), said first and second compressor being screw compressors, the first and second load control units (36, 46) each comprising a slide inlet valve.

4. A compressor system (10) comprising asynchronous electrical motors (32, 42), wherein the compressor system is adapted to:
   receive (100) a command to start a first asynchronous electrical motor (32) and a second asynchronous electrical motor (42) of the compressor system;
   unload (104) said first and said second asynchronous electrical motor, by operating respectively a first load control unit (36) of the first motor and a second load control unit (46) of the second motor, in order to reduce the mechanical load (34, 44) associated to said motors;
   start (106) the first motor (32) and, only once the first motor is running at nominal speed, starting the second motor (42),
   load (114) both the first and second motor only once the second motor has started and is running at nominal speed, by operating the first load control unit (36) and the second load control unit (46), in order to increase the mechanical load associated to said motors.

5. The compressor system of claim 4, wherein the compressor system (10) is further adapted to:
   stop the second motor (42) and, while the first motor (32) and the second motor (42) is still running, receiving a command to restart the second motor;
   unload (124) the first motor (32) and the second motor (42), by operating the first load control unit and the second load control unit, in order to increase the mechanical load associated to said motors;
   start (128) said second motor, while the first motor is still running;
   load (132) both the first and second motor only once the second motor has started and is running at nominal speed, by operating the first load control unit (36) and the second load control unit (46), in order to increase the mechanical load associated to said motors.

\* \* \* \* \*